US012682892B2

(12) United States Patent
Tandecki et al.

(10) Patent No.: US 12,682,892 B2
(45) Date of Patent: *Jul. 14, 2026

(54) METHODS AND SYSTEMS FOR WORD EDIT DISTANCE EMBEDDING

(71) Applicant: Collibra Belgium BV, Brussels (BE)

(72) Inventors: Michael Tandecki, Vilvoorde (BE); Michael Maes, Brussegem (BE); Anna Filipiak, Ostrow Wielkopolski (PL)

(73) Assignee: Collibra Belgium BV, Brussels (BE)

( * ) Notice: Subject to any disclaimer, the term of this patent is extended or adjusted under 35 U.S.C. 154(b) by 194 days.

This patent is subject to a terminal disclaimer.

(21) Appl. No.: 18/795,155

(22) Filed: Aug. 5, 2024

(65) Prior Publication Data

US 2024/0395245 A1 Nov. 28, 2024

Related U.S. Application Data

(63) Continuation of application No. 17/071,913, filed on Oct. 15, 2020, now Pat. No. 12,057,108.

(60) Provisional application No. 63/008,552, filed on Apr. 10, 2020.

(51) Int. Cl.
| | |
|---|---|
| *G10L 15/16* | (2006.01) |
| *G06N 3/08* | (2023.01) |
| *G10L 15/10* | (2006.01) |

(52) U.S. Cl.
CPC ............... *G10L 15/16* (2013.01); *G06N 3/08* (2013.01); *G10L 15/10* (2013.01)

(58) Field of Classification Search
CPC ............ G10L 15/16; G10L 15/10; G06N 3/08
See application file for complete search history.

(56) References Cited

U.S. PATENT DOCUMENTS

| | | | |
|---|---|---|---|
| 9,647,975 | B1 | 5/2017 | Dedenok |
| 11,256,760 | B1 | 2/2022 | Corcoran et al. |
| 12,057,108 | B2 | 8/2024 | Tandecki et al. |
| 2009/0157652 | A1 | 6/2009 | Barbosa et al. |
| 2010/0042405 | A1 | 2/2010 | Tsuzuki et al. |
| 2010/0217582 | A1 | 8/2010 | Waibel et al. |
| 2017/0308790 | A1 | 10/2017 | Nogueira dos Santos et al. |

(Continued)

FOREIGN PATENT DOCUMENTS

| | | |
|---|---|---|
| CN | 110727880 A | 1/2020 |
| JP | 2017173907 A | 9/2017 |

OTHER PUBLICATIONS

International Search Report and Written Opinion, PCT/IB2020/059737, Applicant: Collibra NV, mailed Jan. 26, 2021, 16 pages.

(Continued)

*Primary Examiner* — Bhavesh M Mehta
*Assistant Examiner* — Edward Tracy, Jr.
(74) *Attorney, Agent, or Firm* — Perkins Coie LLP

(57) ABSTRACT

A system for classifying words in a batch of words can include at least one memory device storing instructions for causing at least one processor to create dictionary vectors for each of a plurality of dictionary words using a neural network (NN), store each dictionary vector along with a classification indicator corresponding to the associated dictionary word, and create word vectors for each word in a batch of words for classification using the NN. The closest matching dictionary vectors are found for each word vector and the classification indicators of the closest matching dictionary vector for each word vector in the batch is reported.

20 Claims, 10 Drawing Sheets

(56) References Cited

U.S. PATENT DOCUMENTS

| | | |
|---|---|---|
| 2019/0095429 A1 | 3/2019 | Fan et al. |
| 2019/0266182 A1 | 8/2019 | Yoshikawa |
| 2019/0364088 A1 | 11/2019 | Fu et al. |
| 2020/0285910 A1 | 9/2020 | Steelberg et al. |
| 2020/0380312 A1 | 12/2020 | Khan et al. |
| 2021/0124987 A1 | 4/2021 | Gan et al. |

OTHER PUBLICATIONS

Woodbridge et al., "Detecting Homoglyph Attacks with a Siamese Neural Network", Arxiv.org, Cornell University Library, 201 Olin Library Cornell University, Ithaca, NY 14853, May 24, 2018, 7 pages.

Gomez et al., "LSDE: Levenshtein Space Deep Embedding for Query-by-String Word Spotting", 2017 14th IAPR International Conference on Document Analysis and Recognition, vol. 1, Nov. 9, 2017, Barcelona, Spain, 6 pgs.

Mai Mai, "Transfer Learning for Text Classification with Siamese Networks", URL: https://www.inovex.de/blog/transfer-learning-siamese-networks/, Nov. 21, 2019, downloaded from from the Internet Feb. 11, 2021, 8 pgs.

Jegou et al., "Faiss: A library for efficient similarity search", Facebook Engineering, URL: https://engineering.fb.com/2017/03/29/data-infrastructure/faiss-a-library-for-efficient-similarity-search, posted on Mar. 29, 2017, downloaded from from the Internet Feb. 11, 2021, 10 pgs.

Ryota Takagi et al., Expansion of a Dictionary of Technical Terms Based on Distributed Expressions of Words, IPSJ Research Report, Document Communication (DC) 2018-DC110, Japan, Information Processing Society of Japan, Aug. 30, 2018, ISSN:2188-8892, 7 pgs.

100

102 — Train Neural Network (NN)

104 — Create vectors for Dictionary words with trained NN

106 — Store encoded Dictionary vectors

108 — Create vectors for all words in a batch

110 — Find nearest matches for each word

112 — Apply scores based on distance to closest match

*Training*

200

202 — Encode Training Words using Matrix Technique

204 — Feed Pairs of Encoded Words into Twin CNNs

206 — Calculate Similarity Metric (SM) for each pair of words

208 — Iterate CNN weights to drive Cosine Similarity between Word Vector pairs to match Similarity Metric (SM)

210 — Store Trained CNN

*Setup*

400

402 — Encode Dictionary Words using Matrix Technique

404 — Feed each Encoded Word into Trained CNN

406 — Store Resulting Vector for each word with class and threshold

408 — Index Dictionary Word Vectors for efficient searching (e.g., FAISS)

*Classification*

500

502  Receive Batch of Words for Classification

504  Encode Received Words using Matrix Technique

506  Feed each Encoded Received Word into Trained CNN

508  Find closest matches for resulting vectors in index of Dictionary Word Vectors 510  Report average results for each class corresponding to the Batch of Words

METHODS AND SYSTEMS FOR WORD EDIT DISTANCE EMBEDDING

CROSS-REFERENCE TO RELATED APPLICATION

This application is a continuation of U.S. patent application Ser. No. 17/071,913, filed on Oct. 15, 2020, which claims the benefit of and priority to U.S. Provisional Patent Application No. 63/008,552, filed Apr. 10, 2020, the disclosures of which are incorporated herein by reference in their entirety.

TECHNICAL FIELD

This patent application is directed to text similarity calculation, and more specifically, to word edit distance embedding.

BACKGROUND

Enterprises that deal with personal information whether it be employee information, medical data, or financial information are required to safeguard that information and limit its use. Furthermore, any data collected should be anonymized and stored only as long as necessary. Governments have enacted regulations, such as the European Union's General Data Protection Regulation (GDPR), in an effort to help protect personal information.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
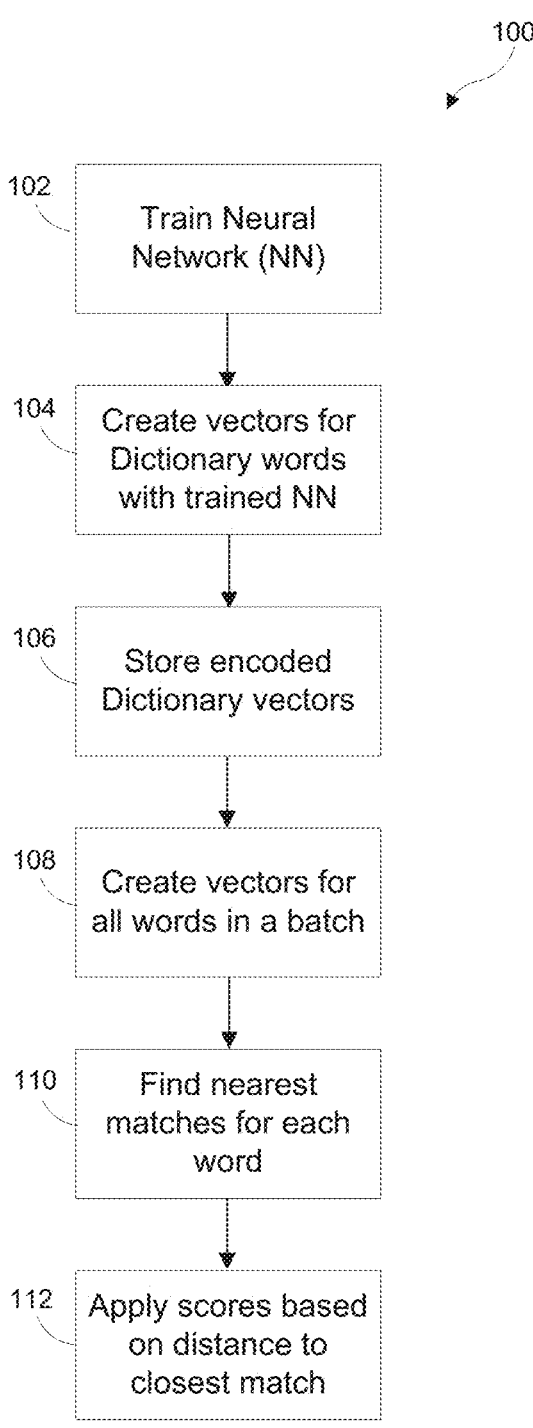
FIG. 1 is a flow diagram showing a method of operation of a processor-based word edit distance embedding system according to some implementations of the present technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for classifying unknown words using a novel neural network and similarity searching architecture. In the context of safeguarding personal information, it is desirable to monitor whether personal information is being transmitted within and/or outside a network. The disclosed technology allows transmissions to be monitored by securely anonymizing words in those transmissions and comparing them to words in various class dictionaries (e.g., countries, names, ethnicity, language, religion, gender, marital status, etc.) in order to determine the classes of information being transmitted. Advantageously, the disclosed technology securely anonymizes and classifies the words without ever saving the original word.

In some embodiments, a neural network is trained and retrained so that the distance between pairs of vectors of a word-based dictionary dataset approximates an edit distance based metric between the corresponding words. Training comprises creating vectors for all dictionary words with the trained neural network and storing the vectors within a particularized structure. A matching algorithm then creates vectors for all words in a batch process, including finding the nearest neighbor matches for each word and applying scores based on distance to the closest dictionary match to determine a classification for each word.

FIG. 1 is a high level flow diagram showing a method of operation 100 of a processor-based word edit distance embedding system for classifying batches of data, e.g., words, according to some implementations of the present technology. The method can include training a neural network (NN) at step 102 with pairs of words so that a distance between corresponding vectors is close to an edit distance based metric between those words. At step 104 vectors for a selection of dictionary words are created with the trained NN. The resulting vectors can be stored at step 106. Next, vectors are created at step 108 for all words in a batch of words to be classified. At step 110 nearest matches for each word in the batch is determined. In some embodiments, a score can be applied, at step 112, to each word in the batch based on a distance to the associated nearest match.

Figure 2:
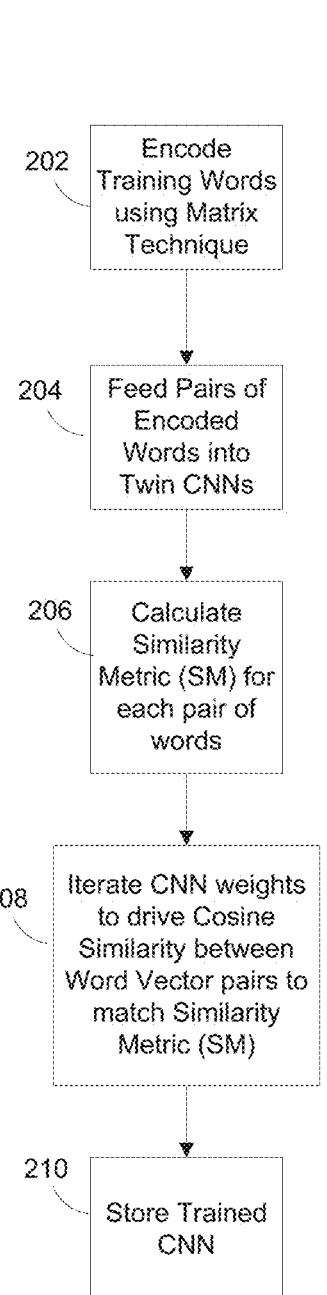
FIG. 2 is a flow diagram illustrating a method for training a neural network for classifying words according to some implementations of the present technology.

FIG. 2 illustrates a method 200 for training a neural network for classifying words according to some implementations of the present technology. In some embodiments, the neural network can be a convolutional neural network (CNN). Training the CNN, for example, can include encoding each of a plurality of training words into matrix form (FIG. 3) at step 202. The training words can include dictionaries of words belonging to particular classes, such as countries, names, ethnicity, language, religion, gender, marital status, and the like. The training dictionaries can include base dictionaries, full English dictionaries, and non-word dictionaries, which contain data that is not similar to any dictionary-like type data.

Figure 4:
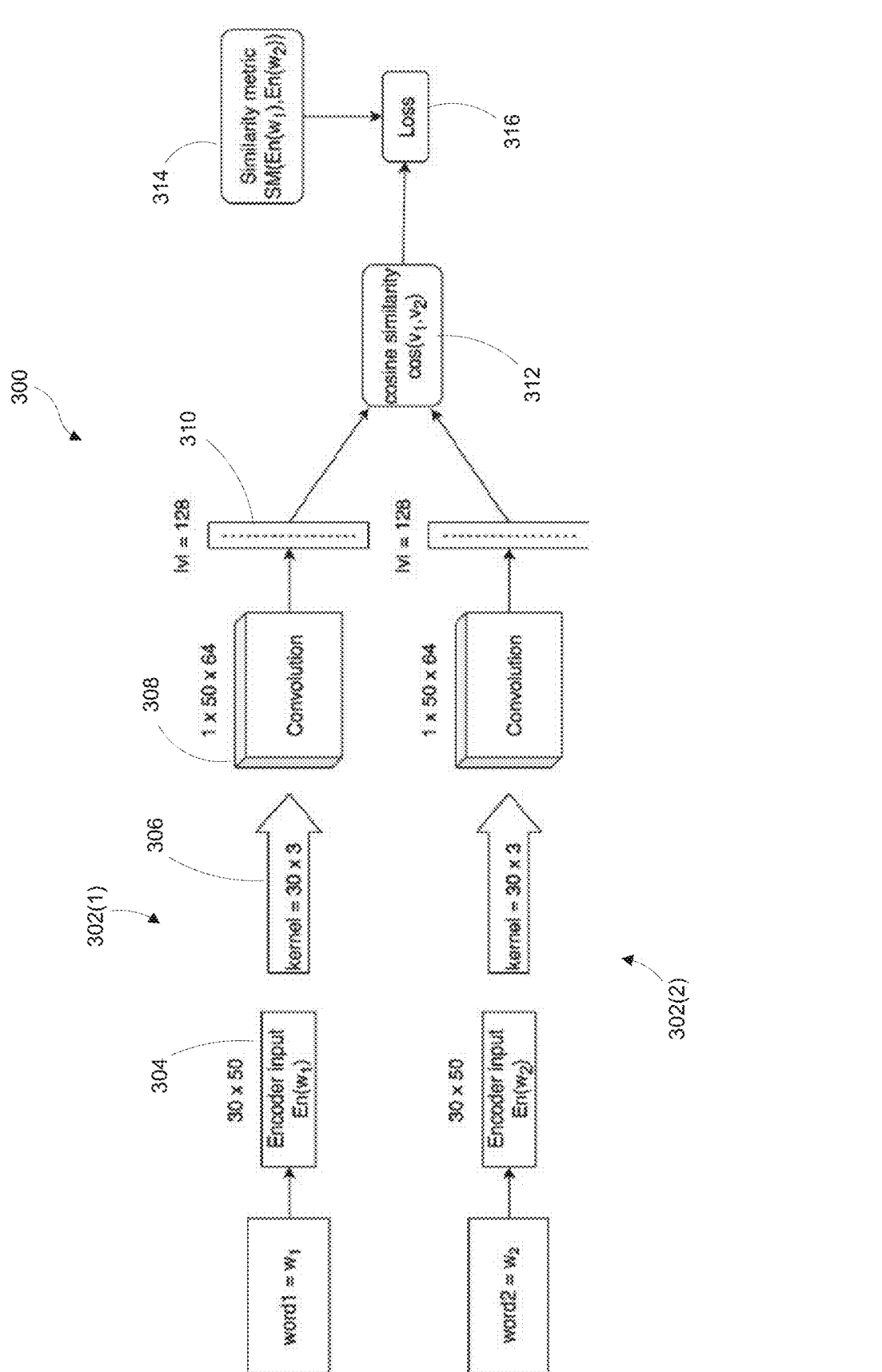
FIG. 4 is a schematic diagram of a training architecture with twin convolutional neural networks according to some implementations of the present technology.

At step 204, pairs of training vectors are created for multiple pairs of the encoded training words using the CNN and a twin of the CNN (FIG. 4). The pairs can be randomly selected from the training dictionaries to train for large word edit distances, and pairs can be created by adding noise to a word to train for small word edit distances.

At step 206, a Similarity Metric (SM) is calculated for each of the multiple pairs of the plurality of training words. The SM can be calculated based on an Edit Distance (ED) (e.g., Levenshtein ED) as follows:

$$SM(word1, word2) = 1 - ED(word1, word2)/max(length(word1), length(word2))$$

In some embodiments, the SM can be based on the encoded form of the words.

At step 208, the similarity metric and a cosine similarity for each pair of training words are compared and the CNN is adjusted (e.g., adjusting weights) based on the comparison in order to drive the Cosine Similarity between pairs to match the Similarity Metric. Using a Cosine Similarity between vectors instead of a Euclidean distance improves computation time and accuracy. Once the CNN is trained it is stored at step 210. In some embodiments, the Cosine Similarity can be calculated by dividing the dot product of the pair of vectors by the product of their Euclidean norms.

Using the above noted Similarity Metric rather than the traditional Levenshtein ED improved the search. This can be illustrated with two examples: two 2-letter codes—PL and PS, and two words—Poland and Roland. Both of these pairs have ED=1. But value 1 has much bigger impact on the first pair, as it changes a half of the word. Therefore, when the error for edit distance is around "1", using ED is much less accurate on short words compared to long ones. In contrast, the disclosed Similarity Metric loses precision on longer pairs (especially on pairs with big edit distance), which is acceptable in the disclosed system, as it is searching for words within some range and exact distance value is not so important if it is too big. In some embodiments, the minimum similarity threshold for accepting a match is 0.7.

Figure 3:
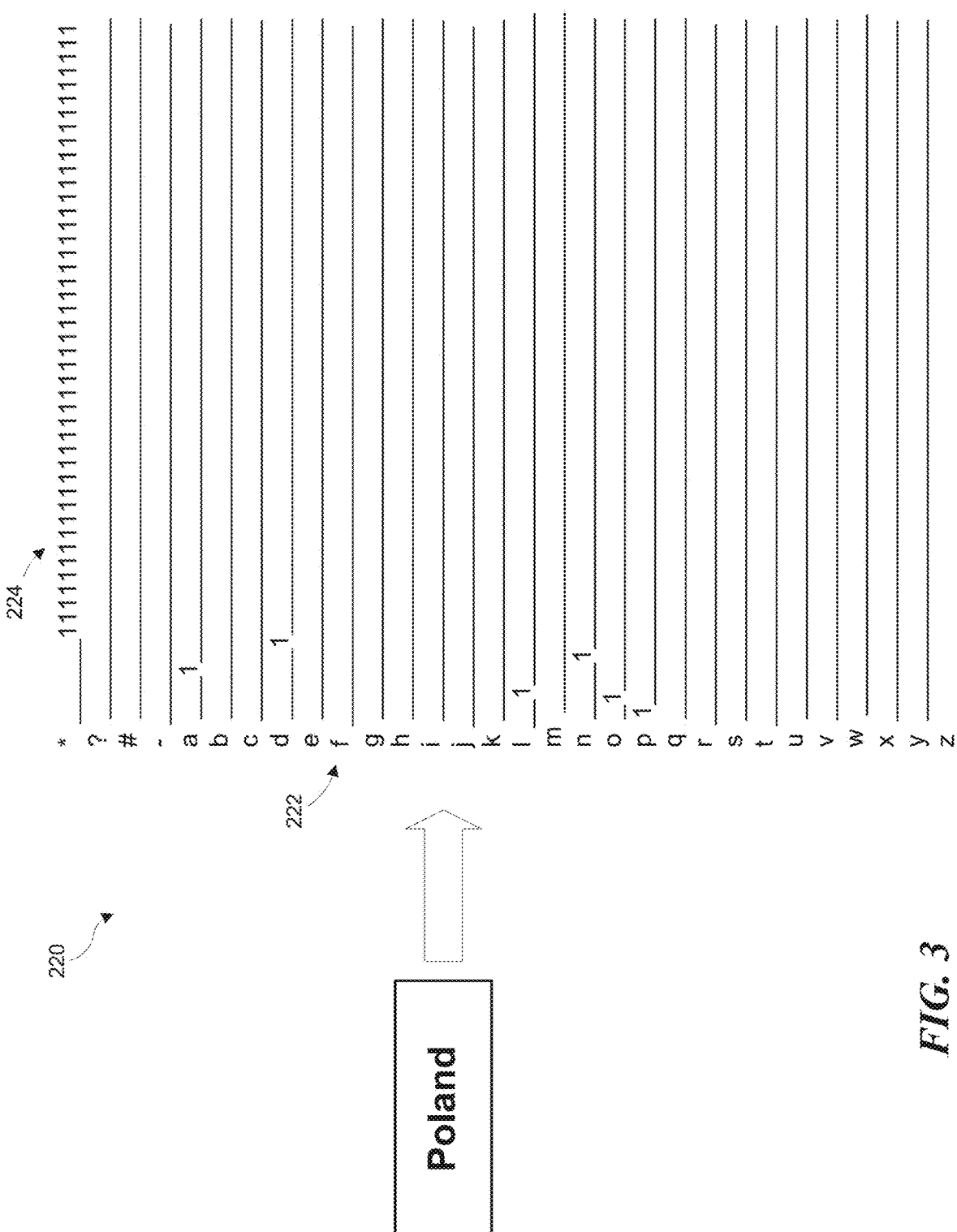
FIG. 3 illustrates a two-dimensional matrix for encoding words according to some implementations of the present technology.

FIG. 3 illustrates a two-dimensional matrix 220 for encoding words (e.g., "Poland") according to some implementations of the present technology. The disclosed two-dimensional matrix is similar to that described in Lluís Gómez, Marçal Rusiñol, and Dimosthenis Karatzas, "LSDE: Levenshtein Space Deep Embedding for Query-by-string Word Spotting", *Document Analysis and Recognition* (IC-DAR) 2017 International Conference, which is incorporated herein by reference in its entirety. The matrix 220 includes a first dimension 222 comprising 26 alphabetic characters along with four special characters and a second dimension 224 comprising character position in the string. The number of character positions can be limited to for example 50 positions resulting in a 30×50 matrix. It should be noted that matrix 220 can encode alpha and non-alpha characters, as well as "empty" characters as outlined below.

Each character in a data set can be grouped as follows:
1. Alphabetic characters-alphabetic characters are normalized (e.g., é=e) resulting in 26 basic alphabetic characters.
2. Digits-one "bag" is created for all numeric characters, represented by "#".
3. Separator characters-one "bag" is created for all separator characters, represented by "-" (e.g., ' ', '-', '_', '.', ',', ':', '/'). However, if any of these characters appears in the data set more than a threshold minimum number of times, it is treated as a separate character.
4. "Empty" positions are represented by "*".
5. Characters that appear in the data set less than a threshold minimum number of times are excluded and represented by "?".

FIG. 4 is a schematic diagram of a training architecture 300 with twin convolutional neural networks according to some implementations of the present technology. The twin CNNs 302(1) and 302(2) have the same structure and the same weights. The inputs to the twin CNNs is the same 30×50 matrix 304, such as that described above with respect to FIG. 3. In some embodiments, the CNN applies a convolutional layer 308 with 64 kernels 306 of size 30×3 and a fully connected layer 310 with 128 output neurons. The Cosine Similarity 312 is calculated for each pair of vectors corresponding to word1 and word2, and compared with the Similarity Metric between encoded word1 and word2 to derive a "loss" 316. The CNN is driven to learn the optimal transformation of words (e.g., strings) into a vector form such that the Cosine Similarity distance between vectors is equivalent to the Similarity Metric of their originating words. In other words, the loss 316 is driven toward zero.

Figure 5:
FIG. 5 is a flow diagram illustrating a method for setting up a word vector index for use in classifying words according to some implementations of the present technology.
Figure 5:
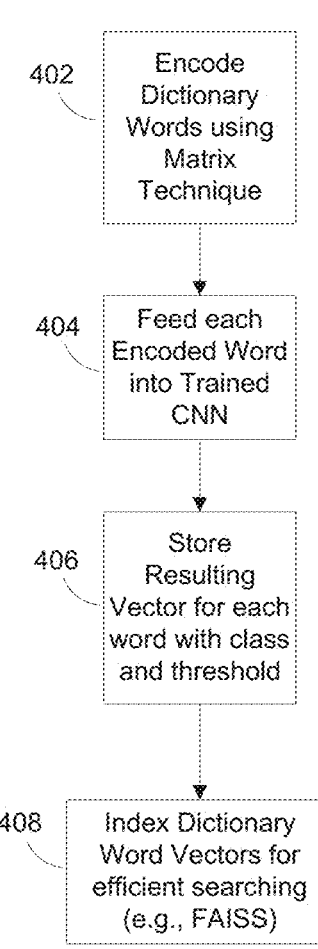
Figure 6:
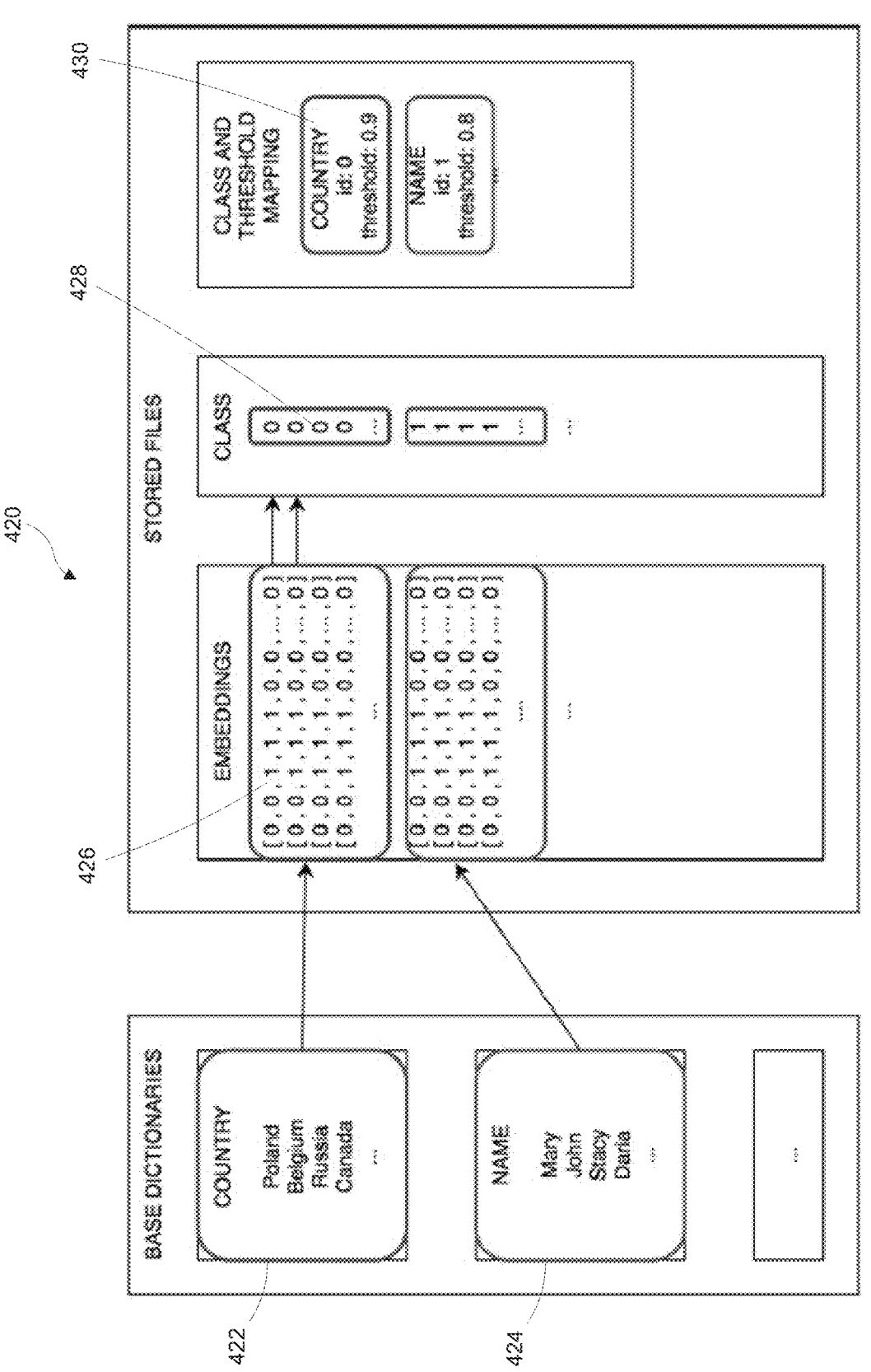
FIG. 6 is a chart illustrating dictionary word embeddings and associated classes and thresholds.

FIG. 5 is a flow diagram illustrating a method 400 for setting up a word vector index for use in classifying words according to some implementations of the present technology. Once the CNN has been trained as described above with respect to FIGS. 2-4, at step 402, a plurality of dictionary words are encoded into matrix form, such as the matrix described above with respect to FIG. 3. In some embodiments, the dictionary words used to train the CNN can comprise the dictionary words used for classification. At step 404, dictionary vectors for each of the plurality of encoded dictionary words are created using the trained CNN. At step 406, the resulting dictionary vectors are stored along with a class corresponding to the associated dictionary word. At step 408, the dictionary word vectors can be indexed for efficient searching. In some embodiments, the vectors are indexed according to Facebook Artificial Intelligence Similarity Searching (FAISS) techniques. FIG. 6 illustrates an example data structure 420 of dictionary word vector embeddings 426 and associated classes 428 and thresholds 430. For example, Country dictionary 422 includes names of various countries and Name dictionary 424 includes various given names. Each individual country and given name corresponds to a vector embedding 426. The class code 428 for countries is "0" and for names is "1". The data structure 420 includes a mapping 430 of class code and class threshold to each vector embedding. In some embodiments, the thresholds for each class can be determined experimentally to minimize false-positives.

Figure 7:
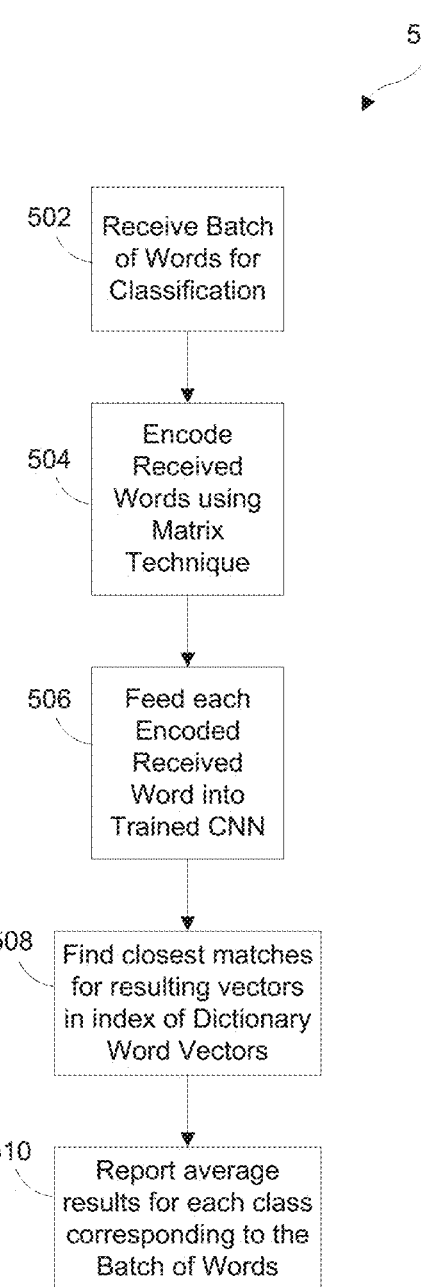
FIG. 7 is a flow diagram illustrating a method for classifying words according to some implementations of the present technology.

FIG. 7 is a flow diagram illustrating a method 500 for classifying words according to some implementations of the present technology. Once the CNN is trained and the dictionary word index is prepared, words in a batch of words of interest can be classified to determine if the words in the batch fall into any sensitive classes of data, e.g., personal information. At step 502, a batch of words for classification is received, but not stored. At step 504, the received words are encoded into matrix form using the technique described above with respect to FIG. 3, for example. At step 506, word vectors for each of the plurality of encoded batch words are created using the trained CNN. At step 508, the closest matches and scores for each resulting word vector in the batch is found in the index of dictionary word vectors by searching for nearest neighbors using, for example, FAISS library. FAISS is a library for efficient similarity search and clustering of dense vectors. It contains algorithms that search in sets of vectors of any size. At step 510, the average results for each class corresponding to the batch of words is reported.

Step 510 can be illustrated with an example batch containing two words: Holand and Cuba. For each word, the closest four matches and corresponding scores are retrieved, as follows:

Holand—Holand, Poland, Roland, Holland

Cuba—Cuba, Coby, Curt, Aruba

Each match is associated with a class and the retrieved scores, as follows:

Holand—Holand (last name—1.0), Poland (country—0.8), Roland (First name—0.8), Holland (country—0.8)

Cuba—Cuba (country—1.0), Coby (first name—0.5), Curt (first name—0.5), Aruba (country—0.6)

For each word in the batch, the highest score for each class is selected, as follows:

Holand—last name: 1.0, country: 0.8, first name: 0.8

Cuba—country: 1.0, first name: 0.5

Given the following class thresholds:

country: 0.8 last name: 0.8 first name: 0.7

The above thresholds are applied to the highest scores for each class. If the score is greater than or equal to the corresponding threshold, the score is retained, if it is less than the threshold value the score is treated as 0, as follows:

Holand—last name: 1.0, country: 0.8, first name: 0.8

Cuba—country: 1.0, first name: 0

Next, the results for each class are averaged, as follows:

last name: (1+0)/2=0.5 country: (0.8+1)/2=0.9 first name: (0.8+0)/2=0.4

And, the results are reported, as follows:

country: 0.9 last name: 0.5 first name: 0.4

The reported results can indicate to a user, without storing or exposing the underlying data, the likelihood that certain classifications of data (e.g., country, last name, and first name) are being transmitted on the system.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 8:
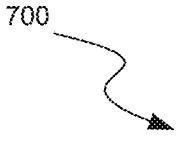
FIG. 8 is a block diagram illustrating an overview of devices on which some implementations can operate.
Figure 8:
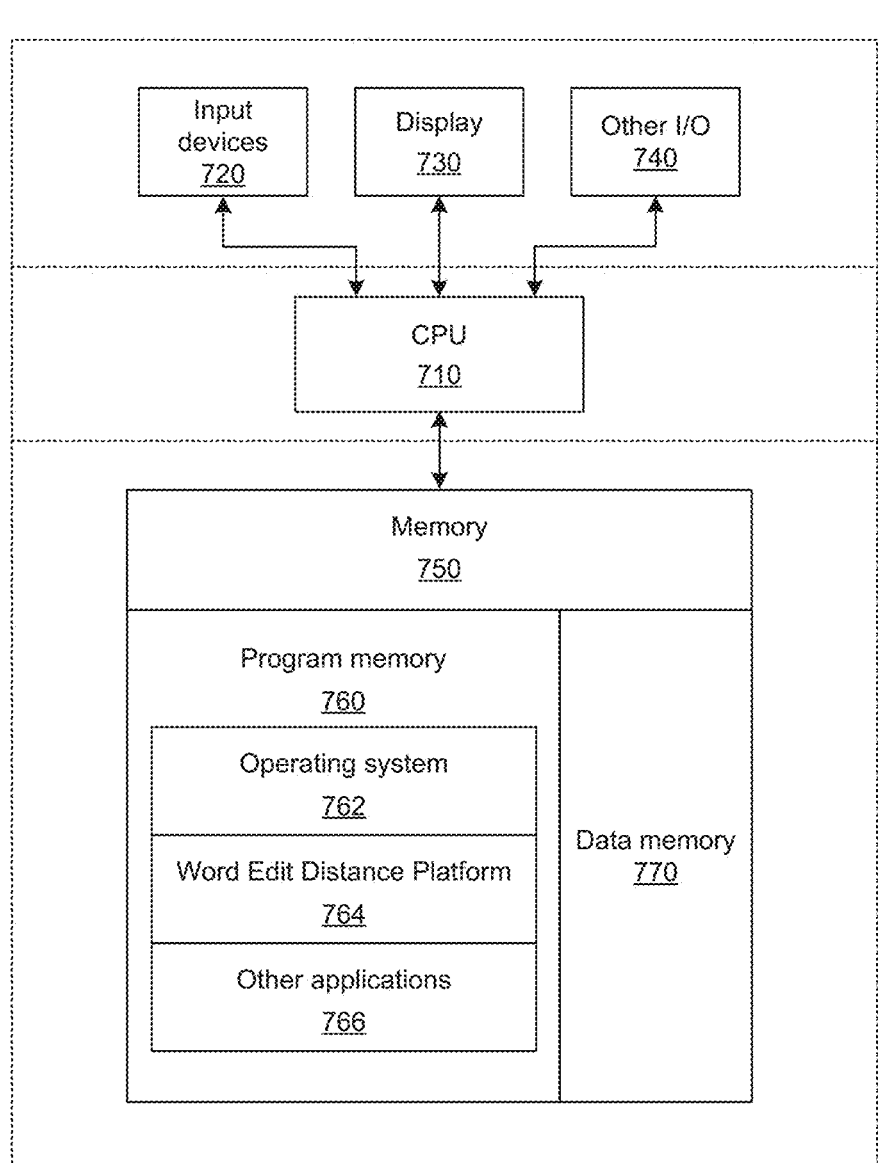

Several implementations are discussed below in more detail in reference to the figures. FIG. 8 is a block diagram illustrating an overview of devices on which some implementations of the disclosed technology can operate. The devices can comprise hardware components of a device 700 that determines risk scores and associated pricing and/or risk ratios. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, Word Edit Distance Embedding Platform 764, and other application programs 766. Memory 750 can also include data memory 770 that can include database information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 9:
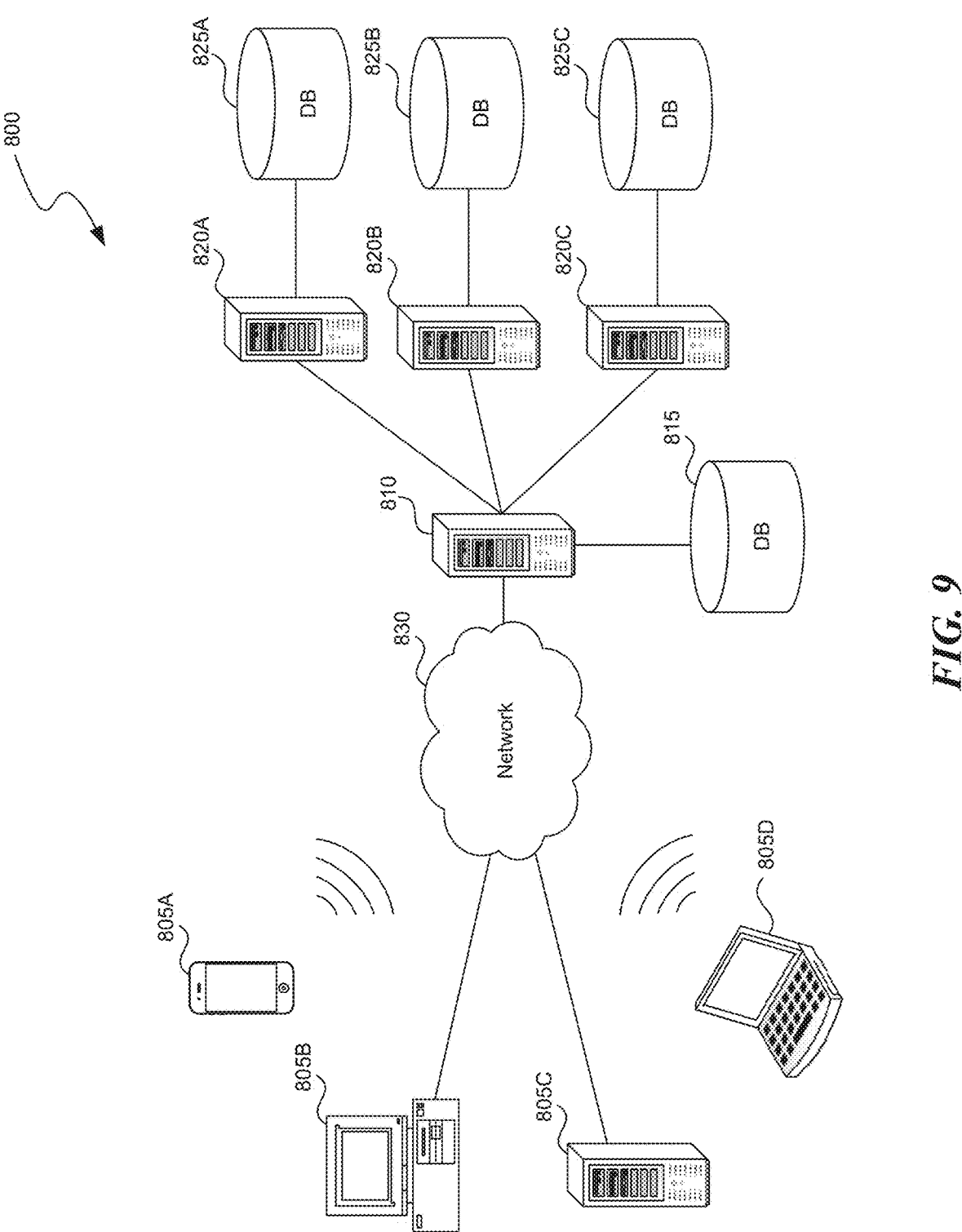
FIG. 9 is a block diagram illustrating an overview of an environment in which some implementations can operate.

FIG. 9 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 10:
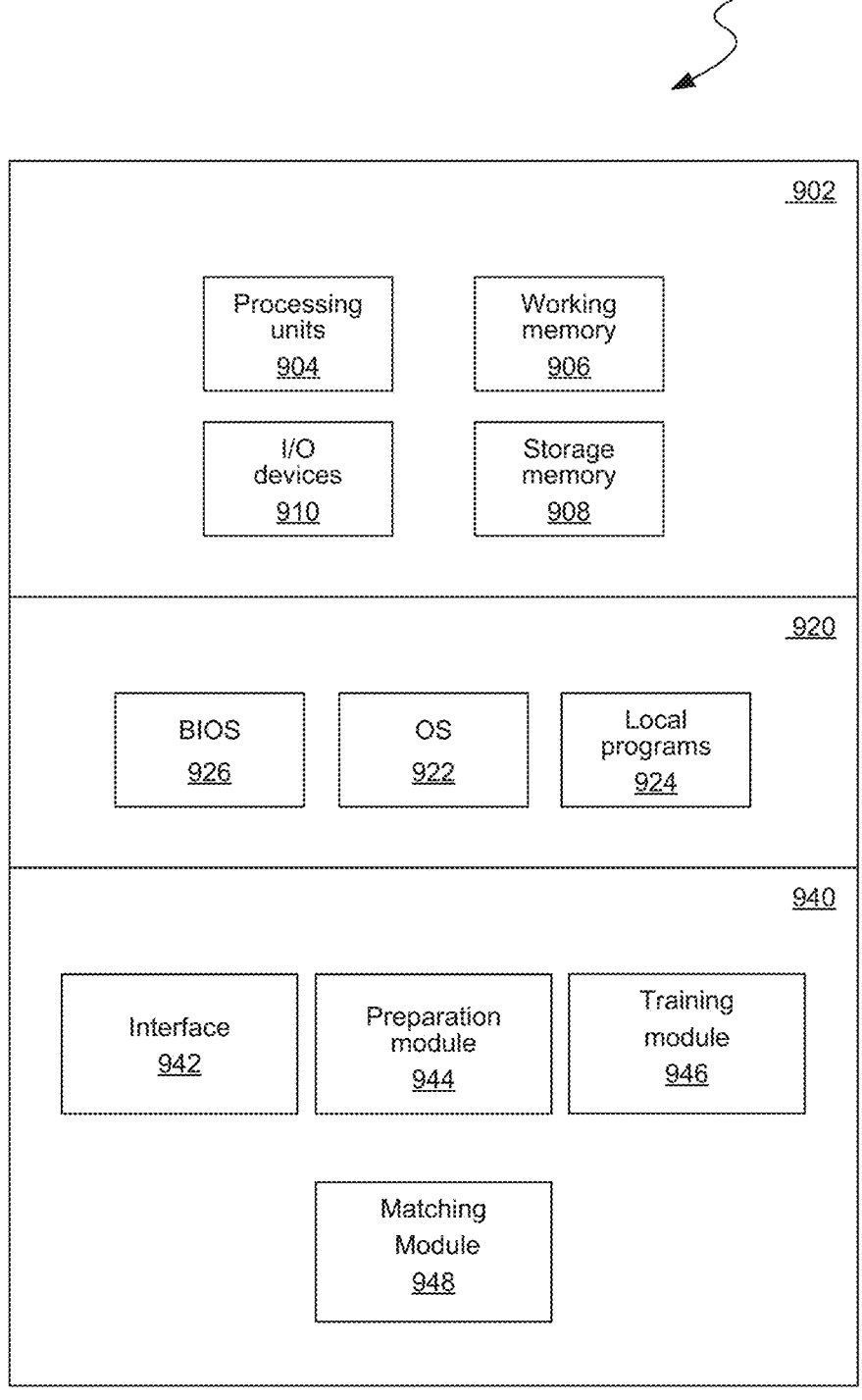
FIG. 10 is a block diagram illustrating components which, in some implementations, can be used in a system employing the disclosed technology.

FIG. 10 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include Preparation Module 944, Training module 946, Matching module 948, and components that can be used for transferring data and controlling the specialized components, such as interface 942. In some implementations, components 900 can be in a computing system that is distributed across multiple computing devices or can be an interface to a server-based application executing one or more of specialized components 940.

Those skilled in the art will appreciate that the components illustrated in FIGS. 8-10 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

Although specific embodiments have been shown by way of example in the drawings and are described in detail above, other embodiments are possible. For example, in some embodiments, a system for classifying words in a batch of words can include at least one memory device storing instructions for causing at least one processor to create dictionary vectors for each of a plurality of dictionary words using a neural network (NN), store each dictionary vector along with a classification indicator corresponding to the associated dictionary word, and create word vectors for each word in a batch of words for classification using the NN. The closest matching dictionary vectors are found for each word vector and the classification indicators of the closest matching dictionary vectors for each word vector in the batch is reported.

In some embodiments, the dictionary words and the words in the batch are encoded into a 30 character by 50 length matrix. In some embodiments, the NN is a convolutional neural network. In some embodiments, each word vector is created without storing the corresponding word from the batch. In some embodiments, each dictionary vector and corresponding classification indicator are indexed to facilitate similarity searching. In some embodiments, the system can further comprise training the NN, including: calculating a similarity metric for multiple pairs of a plurality of training words; creating a pair of training vectors for each of the multiple pairs of training words using the NN and a twin of the NN; calculating a cosine similarity between each pair of training vectors; and comparing the similarity metric and the cosine similarity for each pair of training words and adjusting the NN based on the comparison. In some embodiments, the training words comprise the dictionary words. In some embodiments, the similarity metric is equal to one less the Levenshtein edit distance divided by the length of the longest word in the pair. In some embodiments, the cosine similarity is calculated by dividing the dot product of the pair of training vectors by the product of their Euclidean norms. In some embodiments, each of the one or more closest matching dictionary vectors has an associated score, and wherein reporting the classification indicators for the one or more closest matching dictionary vectors for each word vector in the batch comprises: for each word in the batch, selecting the highest score for each classification indicator; and averaging the selected highest scores for each classification indicator.

In another representative embodiment, a system for classifying words in a batch of words can include at least one memory device storing instructions for causing at least one processor to train a convolutional neural network (CNN); encode each of a plurality of dictionary words into matrix form; create dictionary vectors for each of the plurality of encoded dictionary words using the trained CNN; store each dictionary vector along with a classification indicator corresponding to the associated dictionary word; encode each word in a batch of words for classification into matrix form; create word vectors for each encoded word in the batch using the trained CNN; find the closest matching dictionary vectors for each word vector; and report the classification indicators of the closest matching dictionary vectors for each word vector in the batch. Training the CNN can include: encoding each of a plurality of training words into matrix form; calculating a similarity metric for multiple pairs of the plurality of training words; creating a pair of training vectors for each pair of encoded training words corresponding to the multiple pairs using the CNN and a twin of the CNN; calculating a cosine similarity between each pair of training vectors; comparing the similarity metric and the cosine similarity for each pair of training words and adjusting the CNN based on the comparison; and storing the trained CNN;

In a further representative embodiment, a system for classifying words in a batch of words can include at least one memory device storing instructions for causing at least one processor to: train a neural network (NN); create dictionary vectors for each of a plurality of dictionary words using the trained NN; store each dictionary vector along with a classification indicator corresponding to the associated dictionary word; create word vectors for each word in a batch of words for classification using the trained NN; find the closest matching dictionary vectors for each word vector; and report the classification indicators of the closest matching dictionary vectors for each word vector in the batch.

Training the NN can include calculating a similarity metric for multiple pairs of a plurality of training words, wherein the similarity metric is equal to one less the Levenshtein edit distance divided by the length of the longest word in the pair; creating a pair of training vectors for each of the multiple pairs of training words using the NN and a twin of the NN; calculating a cosine similarity between each pair of training vectors; and comparing the similarity metric and the cosine similarity for each pair of training words and adjusting the NN based on the comparison.

The following examples provide additional embodiments of the present technology.

10

EXAMPLES

1. A system for classifying words in a batch of words, comprising:
at least one memory device storing instructions for causing at least one processor to:
    create dictionary vectors for each of a plurality of dictionary words using a neural network (NN);
    store each dictionary vector along with a classification indicator corresponding to the associated dictionary word;
    create word vectors for each word in a batch of words for classification using the NN;
    find one or more closest matching dictionary vectors for each word vector; and
    report the classification indicators for the one or more closest matching dictionary vectors for each word vector in the batch.
2. The system of example 1, wherein the dictionary words and the words in the batch are encoded into a 30 character by 50 length matrix.
3. The system of example 1 or 2, wherein the NN is a convolutional neural network.
4. The system of any of examples 1 to 3, wherein each word vector is created without storing the corresponding word from the batch.
5. The system of any of examples 1 to 4, wherein each dictionary vector and corresponding classification indicator are indexed to facilitate similarity searching.
6. The system of any of examples 1 to 5, wherein each of the one or more closest matching dictionary vectors has an associated score, and wherein reporting the classification indicators for the one or more closest matching dictionary vectors for each word vector in the batch comprises:
    for each word in the batch, selecting the highest score for each classification indicator; and
    averaging the selected highest scores for each classification indicator.
7. The system of any of examples 1 to 6, further comprising training the NN, including:
    calculating a similarity metric for multiple pairs of a plurality of training words;
    creating a pair of training vectors for each of the multiple pairs of training words using the NN and a twin of the NN;
    calculating a cosine similarity between each pair of training vectors; and
    comparing the similarity metric and the cosine similarity for each pair of training words and adjusting the NN based on the comparison.
8. The system of example 7, wherein the training words comprise the dictionary words.
9. The system of example 7 or 8, wherein the similarity metric is equal to one less the Levenshtein edit distance divided by the length of the longest word in the pair.
10. The system of any of examples 7 to 9, wherein the cosine similarity is calculated by dividing the dot product of the pair of training vectors by the product of their Euclidean norms.
11. A system for classifying words in a batch of words, comprising:
at least one memory device storing instructions for causing at least one processor to:
    train a convolutional neural network (CNN), including:
        encoding each of a plurality of training words into matrix form;
        calculating a similarity metric for multiple pairs of the plurality of training words;

11 creating a pair of training vectors for each pair of encoded training words corresponding to the multiple pairs using the CNN and a twin of the CNN;

calculating a cosine similarity between each pair of training vectors;

comparing the similarity metric and the cosine similarity for each pair of training words and adjusting the CNN based on the comparison; and storing the trained CNN;

encode each of a plurality of dictionary words into matrix form;

create dictionary vectors for each of the plurality of encoded dictionary words using the trained CNN;

store each dictionary vector along with a classification indicator corresponding to the associated dictionary word;

encode each word in a batch of words for classification into matrix form;

create word vectors for each encoded word in the batch using the trained CNN;

find one or more closest matching dictionary vectors for each word vector; and report the classification indicators of the one or more closest matching dictionary vectors for each word vector in the batch.

12. The system of example 11, wherein the training words comprise the dictionary words.

13. The system of example 11 or 12, wherein the similarity metric is equal to one less the Levenshtein edit distance divided by the length of the longest word in the pair.

14. The system of any of examples 11 to 13, wherein the cosine similarity is calculated by dividing the dot product of the pair of training vectors by the product of their Euclidean norms.

15. The system of any of examples 11 to 14, wherein the training words, the dictionary words, and the words in the batch are encoded into a 30 character by 50 length matrix.

16. The system of any of examples 11 to 15, wherein each word vector is created without storing the corresponding word from the batch.

17. The system of any of examples 11 to 16, wherein each dictionary vector and corresponding classification indicator are indexed to facilitate similarity searching.

18. The system of any of examples 11 to 17, wherein each of the one or more closest matching dictionary vectors has an associated score, and wherein reporting the classification indicators for the one or more closest matching dictionary vectors for each word vector in the batch comprises:

for each word in the batch, selecting the highest score for each classification indicator; and averaging the selected highest scores for each classification indicator.

19. A system for classifying words in a batch of words, comprising:

at least one memory device storing instructions for causing at least one processor to:

train a neural network (NN), including:

calculating a similarity metric for multiple pairs of a plurality of training words, wherein the similarity metric is equal to one less the Levenshtein edit distance divided by the length of the longest word in the pair;

12 creating a pair of training vectors for each of the multiple pairs of training words using the NN and a twin of the NN;

calculating a cosine similarity between each pair of training vectors; and comparing the similarity metric and the cosine similarity for each pair of training words and adjusting the NN based on the comparison;

create dictionary vectors for each of a plurality of dictionary words using the trained NN;

store each dictionary vector along with a classification indicator corresponding to the associated dictionary word;

create word vectors for each word in a batch of words for classification using the trained NN;

find one or more closest matching dictionary vectors for each word vector; and report the classification indicators of the one or more closest matching dictionary vectors for each word vector in the batch.

20. The system of example 19, wherein the cosine similarity is calculated by dividing the dot product of the pair of training vectors by the product of their Euclidean norms.

21. The system of example 19 or 20, wherein each of the one or more closest matching dictionary vectors has an associated score, and wherein reporting the classification indicators for the one or more closest matching dictionary vectors for each word vector in the batch comprises:

for each word in the batch, selecting the highest score for each classification indicator; and averaging the selected highest scores for each classification indicator.

22. The system of any of examples 19 to 21, wherein the training words, the dictionary words and the words in the batch are encoded into a 30 character by 50 length matrix prior to creating corresponding vectors with the NN.

23. The system of any of examples 19 to 22, wherein the NN is a convolutional neural network.

24. The system of any of examples 19 to 23, wherein each word vector is created without storing the corresponding word from the batch.

25. The system of any of examples 19 to 24, wherein each dictionary vector and corresponding classification indicator are indexed to facilitate similarity searching.

26. The system of any of examples 19 to 25, wherein the training words comprise the dictionary words.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A system for classifying words in a batch of words, comprising:

at least one memory device storing instructions for causing at least one processor to:

create dictionary vectors for each of a plurality of dictionary words using a neural network (NN);

determine a similarity metric for multiple pairs of training words;

create a pair of training vectors for each pair of the training words using the NN and a twin of the NN;

determine a cosine similarity between each pair of training vectors;

train the NN to learn a transformation of each training word using each pair of training vectors, wherein the cosine similarity between each pair of training vectors is equivalent to the similarity metric for the multiple pairs of training words;

create word vectors for each word in a batch of words for classification using the NN;

find one or more closest matching dictionary vectors for each word vector; and assign a similarity value to each word vector, wherein the similarity value indicates a similarity between each word vector and the one or more closest matching dictionary vectors.

2. The system of claim 1, wherein the dictionary words and the words in the batch are encoded into a 30 character by 50 length matrix.

3. The system of claim 1, wherein the NN is a convolutional neural network.

4. The system of claim 1, wherein each word vector is created without storing a corresponding word from the batch.

5. The system of claim 1, wherein each dictionary vector is indexed to facilitate similarity searching.

6. The system of claim 1, wherein assigning a similarity value to each word vector comprises:

for each word vector in the batch, selecting a highest similarity value compared to a minimum similarity threshold; and averaging selected highest similarity values.

7. The system of claim 1, wherein the training words comprise the dictionary words.

8. The system of claim 1, wherein the similarity metric is equal to one less a Levenshtein edit distance divided by a length of a longest word in the pair.

9. The system of claim 1, wherein the cosine similarity and the similarity metric are the same.

10. The system of claim 1, wherein the cosine similarity is calculated by dividing a dot product of the pair of training vectors by a product of their Euclidean norms.

11. A system for classifying words in a batch of words, comprising:

at least one memory device storing instructions for causing at least one processor to:

train a convolutional neural network (CNN), including:

encoding each of a plurality of training words into matrix form;

calculating a similarity metric for multiple pairs of the plurality of training words;

creating a pair of training vectors for each pair of encoded training words corresponding to the multiple pairs using the CNN and a twin of the CNN;

calculating a cosine similarity between each pair of training vectors;

comparing the similarity metric and the cosine similarity for each pair of training words and adjusting the CNN based on comparing the similarity metric and the cosine similarity for each pair of training words;

encode each of a plurality of dictionary words into matrix form;

create dictionary vectors for each of the plurality of encoded dictionary words using the trained CNN;

store each dictionary vector and a classification indicator corresponding to an associated dictionary word, wherein classification indicators include data identifying at least one of a first name, a last name, a country, and a minimum similarity threshold;

encode each word in the batch of words for classification into matrix form;

create word vectors for each encoded word in the batch using the trained CNN;

find one or more closest matching dictionary vectors for each word vector; and assign a similarity value to each word vector, wherein the similarity value indicates a similarity between each word vector and the one or more closest matching dictionary vectors.

12. The system of claim 11, wherein the training words comprise the dictionary words.

13. The system of claim 11, wherein the similarity metric is equal to one less a Levenshtein edit distance divided by a length of a longest word in the pair.

14. The system of claim 11, wherein the cosine similarity is calculated by dividing a dot product of the pair of training vectors by a product of their Euclidean norms.

15. The system of claim 11, wherein the training words, the dictionary words, and the words in the batch are encoded into a 30 character by 50 length matrix.

16. The system of claim 11, wherein each word vector is created without storing a corresponding word from the batch.

17. The system of claim 11, wherein each dictionary vector and corresponding classification indicator are indexed to facilitate similarity searching.

18. The system of claim 11, wherein assigning a similarity value to each word vector comprises:

for each word vector in the batch, select a highest similarity value compared to a minimum similarity threshold; and average selected highest similarity values.

19. A system for classifying words in a batch of words, comprising:

at least one memory device storing instructions for causing at least one processor to:

train a neural network (NN), including:

calculating a similarity metric for multiple pairs of a plurality of training words;

creating a pair of training vectors for each of the multiple pairs of training words using the NN and a twin of the NN;

calculating a cosine similarity between each pair of training vectors; and comparing the similarity metric and the cosine similarity for each pair of training words and adjusting the NN based on comparing the similarity metric and the cosine similarity, wherein the NN is trained to learn a transformation of each training word using each pair of training vectors, and wherein the cosine similarity between each pair of training vectors is equivalent to the similarity metric for the multiple pairs of training words.

20. The system of claim 19, wherein the cosine similarity is calculated by dividing a dot product of the pair of training vectors by a product of their Euclidean norms.

* * * * *